United States Patent
Yamaguchi et al.

(10) Patent No.: US 8,586,245 B2
(45) Date of Patent: Nov. 19, 2013

(54) BATTERY

(75) Inventors: Akira Yamaguchi, Fukushima (JP);
Kumiko Takagi, Fukushima (JP);
Yuzuru Fukushima, Miyagi (JP);
Satoshi Mizutani, Fukushima (JP);
Hiroshi Inoue, Fukushima (JP);
Atsumichi Kawashima, Fukushima (JP)

(73) Assignee: Sony Corporation, Tokyo (JP)

( * ) Notice: Subject to any disclaimer, the term of this patent is extended or adjusted under 35 U.S.C. 154(b) by 863 days.

(21) Appl. No.: 11/267,641

(22) Filed: Nov. 3, 2005

(65) Prior Publication Data
US 2006/0115739 A1    Jun. 1, 2006

(30) Foreign Application Priority Data

Nov. 5, 2004   (JP) ................ P2004-322740
Apr. 19, 2005  (JP) ................ P2005-121214

(51) Int. Cl.
*H01M 4/13*     (2010.01)

(52) U.S. Cl.
USPC ............. 429/231.8; 429/326; 429/218.1; 429/231.95

(58) Field of Classification Search
USPC .......... 429/326, 330, 218.1, 223, 221, 220, 429/224, 229, 231.5, 231.4
See application file for complete search history.

(56) References Cited

U.S. PATENT DOCUMENTS

| | | | |
|---|---|---|---|
| 5,395,711 A | 3/1995 | Tahara et al. | |
| 5,506,075 A | 4/1996 | Iwasaki et al. | |
| 5,750,730 A * | 5/1998 | Nakano et al. | 549/229 |
| 6,949,312 B1 | 9/2005 | Kawakami et al. | |
| 2003/0180626 A1* | 9/2003 | Shima et al. | 429/326 |
| 2005/0079414 A1* | 4/2005 | Yamamoto et al. | 429/218.1 |
| 2005/0118512 A1* | 6/2005 | Onuki et al. | 429/326 |
| 2005/0250008 A1* | 11/2005 | Mizutani et al. | 429/209 |
| 2006/0024586 A1 | 2/2006 | Tamura et al. | |

FOREIGN PATENT DOCUMENTS

| | | |
|---|---|---|
| JP | 6-325765 | 11/1994 |
| JP | 7-230800 | 8/1995 |
| JP | 07-240232 | 9/1995 |
| JP | 7-288130 | 10/1995 |
| JP | 08-321313 | 12/1996 |
| JP | 09-219217 | 8/1997 |
| JP | 09-251861 | 9/1997 |
| JP | 11-102705 | 4/1999 |
| JP | 2000-311681 | * 11/2000 |
| JP | 2003-11681 | * 11/2000 |
| JP | 2001-093572 | * 4/2001 |
| JP | 2001-143701 | 5/2001 |
| JP | 2003-086244 | * 2/2003 |
| JP | 2003-086244 | * 3/2003 |
| JP | 2003-092137 | 3/2003 |
| JP | 2004-296103 | 10/2004 |
| JP | 2004-296115 | 10/2004 |
| JP | 2004100291 | * 11/2004 |

* cited by examiner

*Primary Examiner* — Patrick Ryan
*Assistant Examiner* — Ben Lewis
(74) *Attorney, Agent, or Firm* — K&L Gates LLP

(57) ABSTRACT

A battery capable of improving battery characteristics such as cycle characteristics and high temperature storage characteristics is provided. An anode includes an anode active material which includes Sn or Si as an element. A separator is impregnated with an electrolyte solution, and the electrolyte solution includes an acid anhydride such as succinic anhydride or a derivative thereof. Thereby, a coating is formed on the anode, and the decomposition of the electrolyte solution in the anode can be prevented. An electrolyte solution to which 4-fluoro-1,3-dioxolane-2-one is mixed is more preferably used.

14 Claims, 6 Drawing Sheets

BATTERY

CROSS REFERENCES TO RELATED APPLICATIONS

The present application claims priority to Japanese Patent Application 2004-322740 filed in the Japanese Patent Office on Nov. 5, 2004 and Japanese Patent Application 2005-121214 filed in the Japanese Patent Office on Apr. 19, 2005, the entire contents of which are being incorporated herein by reference.

BACKGROUND

The present invention relates to a battery using an anode active material which includes at least one of tin (Sn) and silicon (Si) as an element.

The development of batteries with a higher energy density has been demanded according to the downsizing of electronic devices. As a battery which meets the demand, a lithium metal secondary battery using precipitation-dissolution reactions of lithium (Li) is cited. However, in the lithium metal secondary battery, during charge, lithium (Li) is deposited on an anode to form a dendrite, thereby lithium is inactivated, so there is an issue that the cycle life of the lithium metal secondary battery is short.

As a battery with an improved cycle life, a lithium-ion secondary battery is commercially available. In an anode of the lithium-ion secondary battery, an anode active material such as a graphite material using an intercalation reaction of lithium between graphite layers, or a carbonaceous material using an application of insertion and extraction of lithium in pores is used. Therefore, in the lithium-ion secondary battery, lithium is not deposited to form a dendrite, and its cycle life is longer. Moreover, the graphite material or the carbonaceous material is stable in air, so the lithium-ion secondary battery has a big advantage in industrial production.

However, an anode capacity by intercalation has an upper limit stipulated by the composition $C_6Li$ of a first stage graphite intercalation compound. Moreover, it is industrially difficult to control a minute pore structure of the carbonaceous material, and by controlling the minute pore structure, the specific gravity of the carbonaceous material declines, so using the carbonaceous material is not an effective means of improving the anode capacity per unit volume and by extension to a battery capacity per unit volume. It is known that some low-temperature fired carbonaceous materials exhibit an anode discharge capacity exceeding 1000 mAh/g; however, there is an issue that when the battery includes a metal oxide or the like as a cathode, discharge voltage declines, because the metal oxide has a large capacity at a noble potential of 0.8 V or more relative to lithium metal.

Because of these issues, it is considered that it is difficult for existing carbonaceous materials to meet demands for a longer operating time of electronic devices in future and a higher energy density of power sources. Therefore, an anode active material having a greater capability to insert and extract lithium is desired.

On the other hand, as an anode active material capable of achieving a higher capacity, a material to which a fact that some kinds of lithium alloys are electrochemically and reversibly produced and decomposed is applied has been widely researched. For example, a lithium-aluminum alloy has been widely researched, and in U.S. Pat. No. 4,950,566, a silicon alloy has been reported. However, when these alloys are used for an anode of a battery, cycle characteristics will decline. One of the reasons is that these alloys expand and shrink according to charge and discharge, thereby the alloys are pulverized every time charge and discharge are repeated.

Therefore, in order to prevent the pulverization of such an alloy, for example, it is considered that an element not involved in expansion and shrinkage according to insertion and extraction of lithium is substituted for a part of the alloy. For example, $LiSi_aO_b$ ($0 \leq a$, $0 < b < 2$) (refer to Japanese Unexamined Patent Application publication No. H6-325765), $Li_cSi_{1-d}M_dO_e$ (where M is a metal element except for alkali metal or a metalloid element except for silicon; $0 \leq c$; $0 < d < 1$; and $0 < e < 2$) (refer to Japanese Unexamined Patent Application Publication No. H7-230800), a lithium-aluminum-tellurium alloy (refer to Japanese Unexamined Patent Application Publication No. H7-288130) and the like have been proposed. Further, a compound including one or more kinds of non-metal elements and a Group 14 metal element or a Group 14 metalloid element in the long form of the periodic table of the elements (refer to Japanese Unexamined Patent Application Publication No. H 11-102705) has been proposed.

However, even if these anode active materials are used, a decline in cycle characteristics due to expansion and shrinkage is large, so there is an issue that they are not adequate to be used for a mobile devices putting emphasis on cycle characteristics. Moreover, the mobile devices are left under a high temperature environment in many cases, so the improvement of high temperature storage characteristics has been demanded.

SUMMARY

In view of the foregoing, it is desirable to provide a battery capable of improving battery characteristics such as cycle characteristics and high temperature storage characteristics.

According to an embodiment of the present invention, there is provided a battery including: a cathode; an anode; and an electrolyte solution, wherein the anode includes an anode active material which includes at least one of tin and silicon as an element, and the electrolyte solution includes at least one kind of additive selected from the group consisting of acid anhydrides and derivatives of the acid anhydrides.

In the battery according to the embodiment of the invention, the electrolyte solution includes at least one kind of additive selected from the group consisting of acid anhydrides and derivatives of the acid anhydrides, so a coating on the basis of the additive is formed on the anode during charge and discharge, thereby the decomposition of the electrolyte solution can be prevented. Therefore, even if an anode active material including at least one of tin and silicon as an element is used, battery characteristics such as cycle characteristics and high temperature storage characteristics can be improved.

In particular, when the content of the additive in the electrolyte solution is within a range from 0.001 wt % to 10 wt % inclusive, or when the electrolyte solution includes a derivative of a cyclic carbonate having a halogen atom, higher effects could be obtained.

Other and further objects, features and advantages of the invention will appear more fully from the following description.

Additional features and advantages are described herein, and will be apparent from, the following Detailed Description and the figures.

DETAILED DESCRIPTION

Preferred embodiments of the invention will be described in more detail below without limitation and referring to the accompanying drawings. In the following embodiments, a secondary battery using lithium as an electrode reactant will be specifically described.

(First Embodiment)

Figure 1:
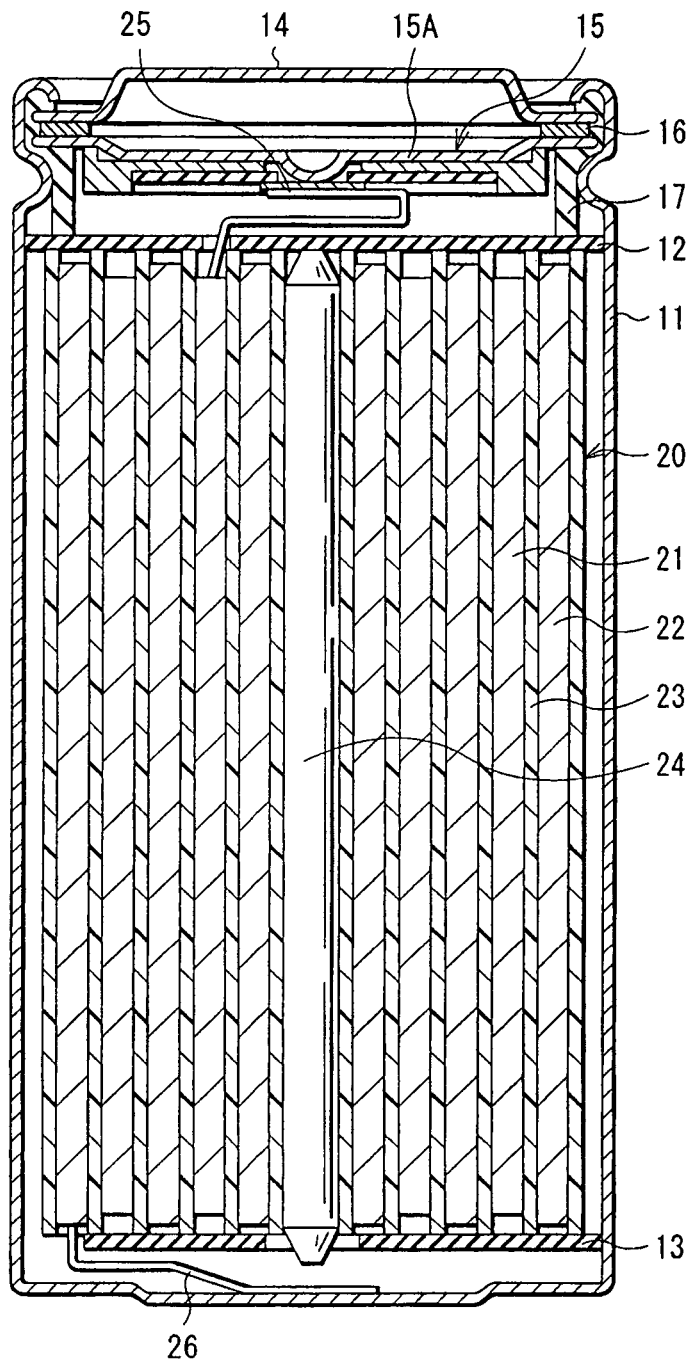
FIG. 1 is a sectional view of a secondary battery according to a first embodiment of the invention.

FIG. 1 shows a sectional view of a secondary battery according to an embodiment. The secondary battery is a so-called cylindrical battery, and includes a spirally wound electrode body 20 in which a strip-shaped cathode 21 and a strip-shaped anode 22 are spirally wound with a separator 23 in between in a substantially hollow cylindrical-shaped battery can 11. The battery can 11 is made of, for example, nickel (Ni)-plated iron (Fe). An end portion of the battery can 11 is closed, and the other end portion thereof is opened. In the battery can 11, a pair of insulating plates 12 and 13 are disposed such that the spirally wound electrode body 20 is sandwiched therebetween in a direction perpendicular to a peripheral winding surface.

In the opened end portion of the battery can 11, a battery cover 14 and, a safety valve mechanism 15 and a positive temperature coefficient device (PTC device) 16 which are disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

For example, a center pin 24 is inserted into the center of the spirally wound electrode body 20. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
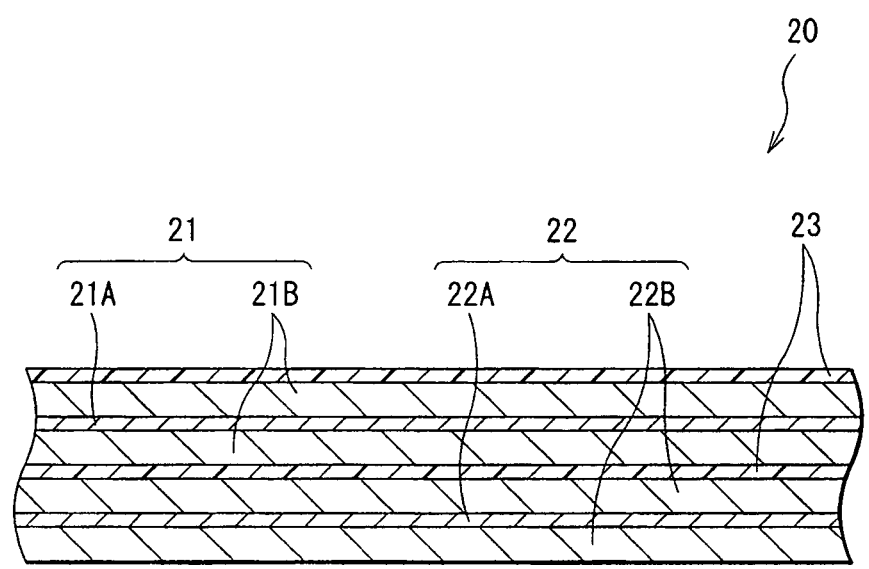
FIG. 2 is an enlarged sectional view of a part of a spirally wound electrode body in the secondary battery shown in FIG. 1.

FIG. 2 shows an enlarged view of a part of the spirally wound electrode body 20 shown in FIG. 1. The cathode 21 has, for example, a structure in which a cathode active material layer 21B is disposed on both sides or either side of a cathode current collector 21A having a pair of facing surfaces. The cathode current collector 21A is made of, for example, metal foil such as aluminum foil, nickel foil or stainless foil.

The cathode active material layer 21B includes, for example, one kind or two or more kinds of cathode materials capable of inserting and extracting lithium as a cathode active material, and may include an electrical conductor such as a carbon material and a binder such as polyvinylidene fluoride, if necessary. Examples of the cathode material capable of inserting and extracting lithium include metal sulfides, metal selenides and metal oxides which include no lithium such as titanium sulfide ($TiS_2$), molybdenum sulfide ($MoS_2$), niobium selenide ($NbSe_2$) and vanadium oxide ($V_2O_5$), and lithium-containing compounds including lithium.

Among them, the lithium-containing compounds are preferable, because some lithium-containing compounds can obtain a high voltage and a high energy density. Examples of such a lithium-containing compound include a complex oxide including lithium and a transition metal element, or a phosphate compound including lithium and a transition metal element, and specifically a lithium-containing compound including at least one kind selected from the group consisting of cobalt (Co), nickel and manganese (Mg) is preferable, because a higher voltage can be obtained. The compound is represented by, for example, a chemical formula $Li_xMIO_2$ or a chemical formula $Li_yMIIPO_4$. In the formulas, MI and MII represent one or more kinds of transition metal elements, and the values of x and y depend upon a charge-discharge state of the battery, and are generally within a range of $0.05 \leq x \leq 1.10$ and $0.05 \leq y \leq 1.10$, respectively.

Specific examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ ($z<1$)), lithium-manganese complex oxide ($LiMn_2O_4$) having a spinel structure and the like. Among them a complex oxide including nickel is preferable, because a higher capacity can be obtained, and superior cycle characteristics can be obtained. Specific examples of the phosphate compound including lithium and a transition metal element include lithium iron phosphate ($LiFePO_4$) and lithium iron manganese phosphate ($LiFe_{1-v}Mn_vPO_4$ ($v<1$)).

The anode 22 has, for example, a structure in which an anode active material layer 22B is disposed on both sides or either side of an anode current collector 22A having a pair of facing surfaces. The anode current collector 22A is made of, for example, metal foil such as copper (Cu) foil, nickel foil or stainless foil.

The anode active material layer 22B includes, for example, an anode material which includes tin or silicon as an element as an anode active material, because tin and silicon have a great capability to insert and extract lithium and can obtain a larger capacity. The anode material may include tin and silicon as elements. Moreover, only one kind or a mixture of two or more kinds with different compositions may be used.

As such an anode material, specifically a simple substance, an alloy or a compound of tin, a simple substance, an alloy or a compound of silicon, or a material including at least a part of a phase including one kind or two or more kinds of them is cited. In the embodiment, the alloy means an alloy including two or more kinds of metal elements and an alloy including one or more kinds of metal elements and one or more kinds of metalloid elements. Moreover, the alloy may include a non-metal element. As the composition of the alloy, a solid solution, a eutectic (eutectic mixture), an intermetallic compound or the coexistence of two or more kinds selected from them is cited.

An example of a tin alloy includes a tin alloy including at least one kind selected from the group consisting of silicon, nickel, copper, iron, cobalt, manganese, zinc (Zn), indium (In), silver (Ag), titanium (Ti), germanium (Ge), bismuth (Bi), antimony (Sb) and chromium (Cr) as a second element except for tin. An example of a silicon alloy includes a silicon alloy including at least one kind selected from the group consisting of tin, nickel, copper, iron, cobalt, manganese, zinc, indium, silver, titanium, germanium, bismuth, antimony and chromium as a second element except for silicon.

As a tin compound or a silicon compound, for example, a compound including oxygen (O) or carbon (C) is cited, and in addition to tin or silicon, the above-described second element may be included.

Among them, as the anode material, a CoSnC-containing material in which tin, cobalt and carbon are included as elements, and the carbon content is within a range from 9.9 wt % to 29.7 wt % inclusive, and the ratio of cobalt to the total of tin and cobalt is within a range from 30 wt % to 70 wt % inclusive is preferable, because the CoSnC-containing material can obtain a higher energy density within such a composition range, and can obtain superior cycle characteristics.

The CoSnC-containing material may further include another element, if necessary. As another material, for example, silicon, iron, nickel, chromium, indium, niobium (Nb), germanium, titanium, molybdenum (Mo), aluminum, phosphorus (P), gallium (Ga) or bismuth is preferable, and two or more kinds selected from them may be included, because the capacity or the cycle characteristics can be further improved.

The CoSnC-containing material includes a phase including tin, cobalt and carbon, and the phase preferably has a structure with low crystallinity or an amorphous structure. Moreover, in the CoSnC-containing material, at least a part of carbon as an element is preferably bonded to a metal element or a metalloid element which is another element. It is considered that a decline in the cycle characteristics results from cohesion or crystallization of tin or the like; however, when carbon is bonded to another element, such cohesion or crystallization can be prevented.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. In the case of surface contamination carbon, the peak is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

In the XPS measurement, for example, the peak of C1s is used to correct the energy axis of a spectrum. In general, surface contamination carbon exists on a surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated through analyzing the waveform through the use of, for example, commercially available software. In the analysis of the waveform, the position of a main peak existing on a lowest binding energy side is used as an energy reference (284.8 eV).

The anode active material layer 12 may further include another anode active material, or may include another material which does not contribute to charge such as an electrical conductor, a binder or a viscosity modifier. As another anode active material, for example, a carbon material such as natural graphite, artificial graphite, non-graphitizable carbon or graphitizable carbon is cited. As the electrical conductor, graphite fiber, metal fiber or metal powder is cited. As the binder, a fluorine-based high molecular weight compound such as polyvinylidene fluoride, or synthetic rubber such as styrene butadiene rubber, or ethylene propylene diene rubber. As the viscosity modifier, carboxymethyl cellulose or the like is cited.

The separator 23 isolates between the cathode 21 and anode 22 so as to pass lithium ions through while preventing a short circuit of a current due to the contact between the cathode 21 and the anode 22. The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated.

The separator 23 is impregnated with an electrolyte solution which is a liquid electrolyte. The electrolyte solution includes, for example, a solvent and an electrolyte salt dissolved in the solvent.

As the solvent, for example, a nonaqueous solvent such as ethylene carbonate, propylene carbonate, dimethyl carbonate, diethyl carbonate, methyl ethyl carbonate, 4-fluoro-1,3-dioxolane-2-one shown in Chemical Formula 1(1), 4-chloro-1,3-dioxolane-2-one shown in Chemical Formula 1(2), 4-trifluoromethyl-1,3-dioxolane-2-one, 1,2-dimethoxyethane, 1,2-diethoxyethane, γ-butyrolactone, γ-valerolactone, tetrahydrofuran, 2-methyltetrahydrofuran, 1,3-dioxolane, 4-methyl-1,3-dioxolane, 1,3-dioxol-2-one, 4-vinyl-1,3-dioxolane-2-one, diethyl ether, sulfolane, methylsulfolane, acetonitrile, propionitrile, anisole, acetate, butyrate, propionate, fluorobenzene or ethylene sulfite is cited. As the solvent, one kind or a mixture of two or more kinds may be used.

[Chemical Formula 1]

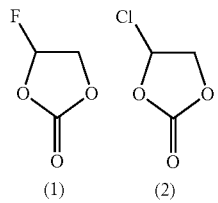

(1)  (2)

Among them, a mixture of a high-permittivity solvent with a relative permittivity of 30 or more and a low-viscosity solvent with a viscosity of 1 mPa·s or less is preferably used, because a higher ionic conductivity can be obtained. As the high-permittivity solvent, for example, a cyclic compound is cited, and a cyclic carbonate such as ethylene carbonate or propylene carbonate, or a derivative of a cyclic carbonate having a halogen atom such as 4-fluoro-1,3-dioxolane-2-one, 4-chloro-1,3-dioxolane-2-one or 4-trifluoromethyl-1,3-dioxolane-2-one is preferable, and 4-fluoro-1,3-dioxolane-2-one or 4-chloro-1,3-dioxolane-2-one is more preferable, and specifically 4-fluoro-1,3-dioxolane-2-one is preferable, because resistance to reduction is high and it is not easily decomposed. Moreover, as the low-viscosity solvent, for example, a chain compound is cited, and a chain carbonate such as dimethyl carbonate, diethyl carbonate, or methyl ethyl carbonate is preferable. In the high-permittivity solvent and the low-viscosity solvent, only one kind or a mixture of two or more kinds selected from them may be used.

As an electrolyte salt, for example, a lithium salt such as $LiPF_6$, $LiBF_4$, $LiClO_4$, $LiAsF_6$, $LiN(CF_3SO_2)_2$, $LiN(C_2F_5SO_2)_2$, $LiC(CF_3SO_2)_3$, $LiB(C_6H_5)_4$, $LiB(C_2O_4)_2$, $LiCF_3SO_3$, $LiCH_3SO_3$, $LiCl$ or $LiBr$ is cited. As the electrolyte salt, only one kind or a mixture of two or more kinds selected from them may be used.

Moreover, in the electrolyte solution, at least one kind of additive selected from the group consisting of acid anhydrides and derivatives thereof is included, because a coating is formed on the surface of the anode by the additive, and the decomposition of the electrolyte solution can be prevented. As the additive, a cyclic compound including a —C(=O)—O—C(=O)— group in a ring is preferable, and for example, succinic anhydride shown in Chemical Formula 2(1), glutaric anhydride shown in Chemical Formula 2(2), maleic anhydride shown in Chemical Formula 2(3), phthalic anhydride shown in Chemical Formula 2(4), 2-sulfobenzoic anhydride shown in Chemical Formula 2(5), citraconic anhydride shown in Chemical Formula 2(6), itaconic anhydride shown in Chemical Formula 2(7), diglycolic anhydride shown in Chemical Formula 2(8), hexafluoroglutaric anhydride shown in Chemical Formula 2(9), a derivative of phthalic anhydride such as 3-fluorophthalic anhydride shown in Chemical Formula 2(10) or 4-fluorophthalic anhydride shown in Chemical Formula 2(11), 3,6-epoxy-1,2,3,6-tetrahydrophthalic anhydride shown in Chemical Formula 2(12), 1,8-naphthalic anhydride shown in Chemical Formula 2(13), 2,3-naphthalenecarboxylic anhydride shown in Chemical Formula 2(14), 1,2-cycloalkanedicarboxylic anhydride such as 1,2-cyclopentanedicarboxylic anhydride or 1,2-cyclohexanedicarboxylic anhydride, tetrahydrophthalic anhydride such as cis-1,2,3,6-tetrahydrophthalic anhydride or 3,4,5,6-tetrahydrophthalic anhydride, hexahydrophthalic anhydride (cis-isomer, trans-isomer), 3,4,5,6-tetrachlorophthalic anhydride, 1,2,4-benzenetricarboxylic anhydride, pyromellitic dianhydride, or a derivative thereof is cited. Such a cyclic compound may be formed, for example, through dehydrating carbonic acids, or dehydrating a compound including a carbonic acid and a sulfonic acid or a compound a sulfonic acid and a sufonic acid.

[Chemical Formula 2]

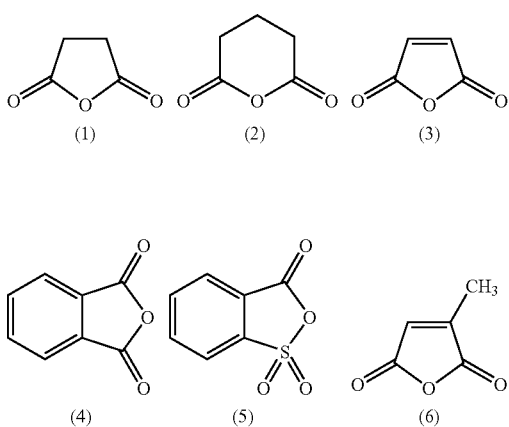

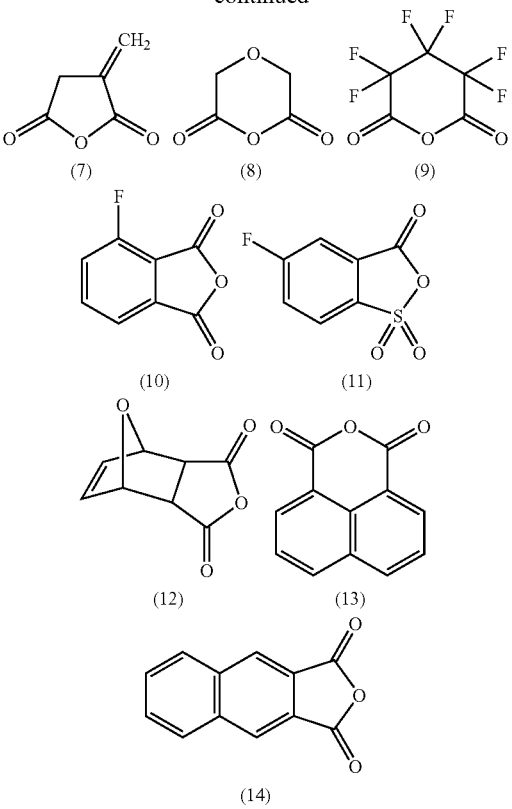

The content of the additive in the electrolyte solution is preferably within a range from 0.001 wt % to 10 wt % inclusive, and more preferably within a range from 0.005 wt % to 4 wt % inclusive, and more preferably within a range from 0.01 wt % to 3 wt % inclusive, because when the content is too small, it is difficult to obtain a sufficient effect, and when the content is too large, the amount of the coating on the basis of them increases, thereby internal resistance in a battery increases, thereby various characteristics decline.

The secondary battery can be manufactured through the following steps, for example.

At first, for example, the cathode active material layer 21B is formed on the cathode current collector 21A to form the cathode 21. The cathode active material layer 21B is formed through the following steps. For example, the powder of the cathode active material, an electrical conductor and a binder are mixed to form a cathode mixture, and then the cathode mixture is dispersed in a solvent such as N-methyl-2-pyrrolidone to form paste-form cathode mixture slurry. The cathode active material layer 21B is formed through applying the cathode mixture slurry to the cathode current collector 21A, drying the cathode mixture slurry, and compression molding the cathode mixture slurry. Moreover, for example, the anode active material layer 22B is formed on the anode current collector 22A to form the anode 22. The anode active material layer 22B may be formed by, for example, a vapor-phase method, a liquid-phase method, a firing method, or coating, or a combination of two or more methods selected from them.

Next, the cathode lead 25 is attached to the cathode current collector 21A by welding or the like, and the anode lead 26 is attached to the anode current collector 22A by welding or the like. After that, a laminate including the cathode 21 and the anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 is sandwiched between a pair of insulating plates 12 and 13, and the spirally wound laminate is contained in the battery can 11. After the spirally wound laminate including the cathode 21 and the anode 22 is contained in the battery can 11, the electrolyte solution is injected into the battery can 11 to impregnate the separator 23 with the electrolyte solution. After that, the battery cover 14, the safety valve mechanism 15 and the PTC device 16 are fixed in an opened end portion of the battery can 11 through caulking by the gasket 17. Thereby, the secondary battery shown in FIG. 1 is completed.

When the secondary battery is charged, lithium ions are extracted from the cathode 21, and are inserted into the anode 22 through the electrolyte solution. On the other hand, when the secondary battery is discharged, for example, lithium ions are extracted from the anode 22, and are inserted into the cathode 21 through the electrolyte solution. At this time, the electrolyte solution includes an acid anhydride or a derivative thereof, so a coating on the basis of the acid anhydride or the derivative thereof is formed on the anode 22, and the decomposition of the electrolyte solution can be prevented. Therefore, battery characteristics such as the cycle characteristics and high temperature storage characteristics can be improved.

Thus, in the embodiment, an acid anhydride or a derivative thereof is included as an additive in the electrolyte solution, so a coating is formed on the anode 22, and the decomposition of the electrolyte solution can be prevented. Therefore, even if an anode active material including at least one of tin and silicon is used, the battery characteristics such as the cycle characteristics and high temperature storage characteristics can be improved.

In particular, when the content of the additive in the electrolyte solution is within a range from 0.001 wt % to 10 wt % inclusive, more specifically 0.005 wt % to 4 wt % inclusive, or when a derivative of cyclic carbonate having a halogen atom is included in the electrolyte solution, a higher effect can be obtained.

(Second Embodiment)

Figure 3:
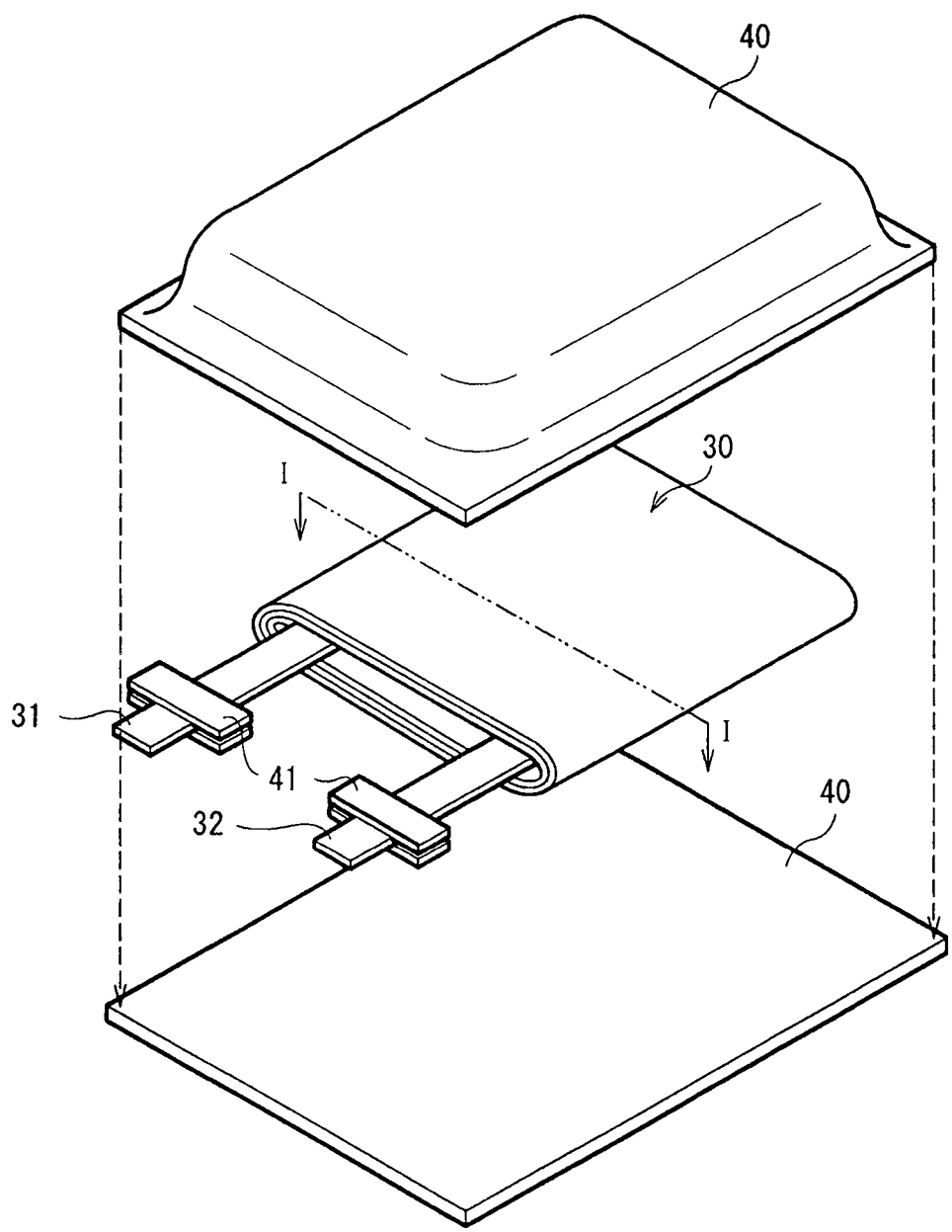
FIG. 3 is a perspective exploded view of a secondary battery according to a second embodiment of the invention.

FIG. 3 shows the structure of a secondary battery according to a second embodiment. The secondary battery is a so-called laminate film type secondary battery, and in the secondary battery, a spirally wound electrode body 30 to which a cathode lead 31 and an anode lead 32 are attached is contained in film-shaped package members 40.

The cathode lead 31 and the anode lead 32 are drawn from the interior of the package members 40 to outside, for example, in the same direction. The cathode lead 31 and the anode lead 32 are made of, for example, a metal material such as aluminum, copper, nickel or stainless, and have a thin plate form or a mesh form.

The package members 40 are made of, for example, a rectangular aluminum laminate film including a nylon film, aluminum foil and a polyethylene film laminated in this order. The package members 40 are disposed such that the polyethylene films of the package members 40 face the spirally wound electrode body 30, and edge portions of the package members 40 are adhered to each other by fusion bonding or an adhesive. An adhesive film 41 for preventing the entry of outside air is inserted between the package members 40, the cathode lead 31 and the anode lead 32. The adhesive film 41 is made of, for example, a material having adhesion to the cathode lead 31 and the anode lead 32, for example, a polyolefin resin such as polyethylene, polypropylene, modified polyethylene or modified polypropylene.

The package members 40 may be made of a laminate film with any other structure, a high molecular weight film such as polypropylene or a metal film instead of the above-described aluminum laminate film.

Figure 4:
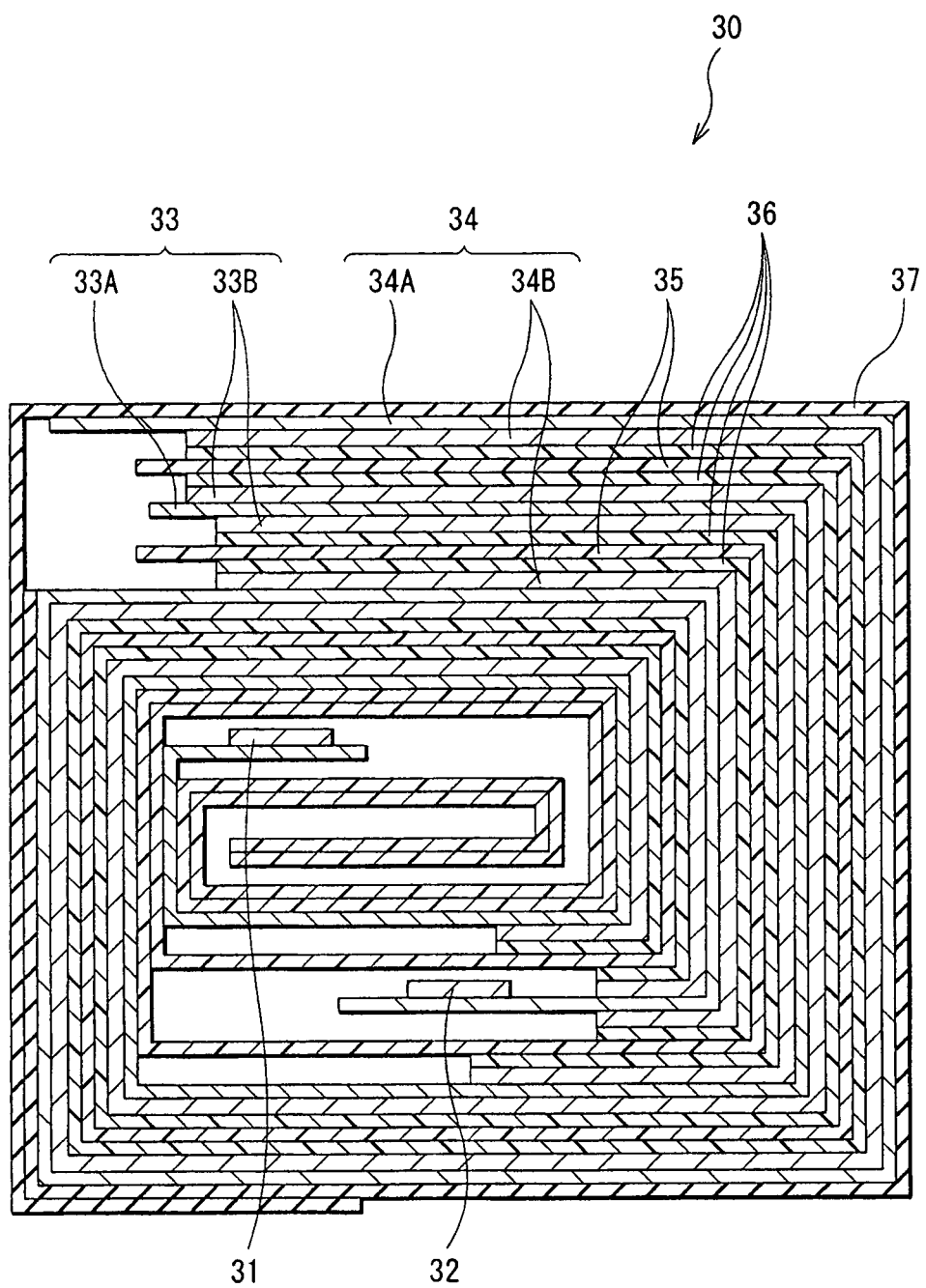
FIG. 4 is a sectional view of a spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is disposed on one side or both sides of a cathode current collector 33A. The anode 34 has a structure in which an anode active material layer 34B is disposed on one side or both sides of an anode current collector 34A, and the anode 34 is disposed such that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first embodiment, respectively.

The electrolyte layer 36 includes an electrolyte solution according to the embodiment and a high molecular weight compound as a holding body holding the electrolyte solution, and is a so-called gel electrolyte. The gel electrolyte is preferable, because the gel electrolyte can obtain high ion conductivity, and can prevent leakage of the battery. The examples of the high molecular weight material include an ether-based high molecular weight compound such as polyethylene oxide or a cross-link including polyethylene oxide, a ester-based high molecular weight compound such as polymethacrylate, an acrylate-based high molecular weight compound, or a polymer of vinylidene fluoride such as polyvinylidene fluoride, or a copolymer of vinylidene fluoride and hexafluoropropylene, and one kind or a mixture of two or more kinds selected from them is used. In particular, in terms of stability of oxidation-reduction, the flurorine-based high molecular weight compound such as a polymer of vinylidene fluoride is preferable.

The secondary battery can be manufactured through the following steps, for example.

At first, a precursor solution including the electrolyte solution, the high molecular weight compound and a mixed solvent is applied to the cathode 33 and the anode 34, and the mixed solvent is volatilized to form the electrolyte layer 36. After that, the cathode lead 31 is attached to an end portion of the cathode current collector 33A through welding, and the anode lead 32 is attached to an end portion of the anode current collector 34A through welding. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is adhered to an outermost portion of the laminate so as to form the spirally wound electrode body 30. Finally, for example, the spirally wound electrode body 30 is sandwiched between the package members 40, and edge portions of the package members 40 are adhered to each other through thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the secondary battery may be formed through the following steps. At first, as described above, the cathode 33 and the anode 34 are formed, and after the cathode lead 31 and the anode lead 32 are attached to the cathode 33 and the anode 34, the cathode 33 and the anode 34 are laminated with the separator 35 in between to form a laminate, and the laminate is spirally wound, and the protective tape 37 is adhered to an outermost portion of the laminate so as to form a spirally wound body as a precursor body of the spirally wound electrode body 30. Next, the spirally wound body is sandwiched between the package members 40, and the edge portions of the package members 40 except for one side are adhered through thermal fusion bonding to form a bag shape. Then, the spirally wound body is contained in the package members 40. Next, a composite for an electrolyte including the electrolyte solution, monomers as the materials of the high molecular weight compound and a polymerization initiator, and if necessary, another material such as a polymerization inhibitor is prepared, and the composite is injected into the interior of the package members 40.

After the composite for an electrolyte is injected, an opening of the package members 40 is sealed through thermal fusion bonding in a vacuum atmosphere. Next, the monomers are polymerized through applying heat to form a high molecular weight compound, thereby the gel electrolyte layer 36 is formed, and the secondary battery shown in FIGS. 3 and 4 is assembled.

The functions and the effects of the secondary battery are the same as those in the first embodiment. More specifically, an acid anhydride or a derivative thereof is included in the electrolyte solution, so the decomposition of the electrolyte solution can be prevented.

EXAMPLES

Next, specific examples of the invention will be described below.

Examples 1-1 Through 1-12

Cylindrical secondary batteries shown in FIG. 1 were formed.

At first, 0.5 mol of lithium carbonate and 1 mol of cobalt carbonate were mixed to form a mixture, and the mixture was fired in an air atmosphere at 890° C. for five hours to synthesize lithium-cobalt complex oxide ($LiCoO_2$) as a cathode active material, and then the lithium-cobalt complex oxide was pulverized to form powder with an average particle diameter of 10 μm. When X-ray diffraction measurement was carried out on the obtained lithium cobalt complex oxide, the result was in good agreement with the spectrum of lithium-cobalt complex oxide ($LiCoO_2$) registered in the JCPDS file.

Next, 95 parts by weight of the lithium-cobalt complex oxide powder and 5 parts by weight of lithium carbonate powder were mixed to form a mixture, and 91 parts by weight of the mixture, 6 parts by weight of graphite (KS-15 of Lonza) as an electrical conductor, and 3 parts by weight of polyvinylidene fluoride as a binder were mixed to form a cathode mixture, and then the mixture was dispersed in N-methyl-2-pyrrolidone as a solvent to form cathode mixture slurry. Next, after the cathode mixture slurry was applied to both sides of the cathode current collector 21A made of aluminum foil with a thickness of 20 μm, and was dried, the cathode active material layer 21B was formed through compression molding, thereby the strip-shaped cathode 21 was formed.

On the other hand, 10 g of copper powder and 90 g of tin powder were mixed to form a mixture, and the mixture was put into a quartz boat, and was heated in an argon gas atmosphere at 1000° C., and then the mixture was left and cooled to a room temperature. A block obtained thereby was pulverized with a ball mill in an argon gas atmosphere to obtain copper-tin alloy powder (10Cu-90Sn). The number before a chemical symbol indicates a weight ratio. Next, the copper-tin alloy powder was used as an anode active material, and after 80 parts by weight of the copper-tin alloy powder, 11 parts by weight of graphite (KS-15 of Lonza) and 1 part by weight of acetylene black as electrical conductors and anode active materials, and 8 parts by weight of polyvinylidene fluoride as a binder were mixed to prepare an anode mixture, the anode mixture was dispersed in N-methyl-2-pyrrolidone as a solvent to form anode mixture slurry. Next, after the anode mixture slurry was applied to both sides of the anode current collector 22A made of copper foil with a thickness of 10 μm, and was dried, the anode mixture slurry was compression molded to form the anode active material layer 22B, thereby the strip-shaped anode 22 was formed.

The cathode 21 and the anode 22 which were formed as described above were laminated with the separator 23 made of a microporous polypropylene film (E25MMS of Tonen Chemical) with a thickness of 25 μm in between to form a laminate in which the anode 22, the separator 23, the cathode 21 and the separator 23 were laminated in this order, and the laminate was spirally wound several times to form the spirally wound electrode body 20 with an outside diameter of 18 mm. The spirally wound electrode body 20 was fixed with an adhesive tape (not shown).

The spirally wound electrode body 20 was contained in the battery can 11 made of nickel-plated iron. The insulating plates 12 and 13 were disposed on the top side and the bottom side of the spirally wound electrode body 20, and the cathode lead 25 made of aluminum was drawn from the cathode current collector 21A, and was welded to the battery cover 14, and the anode lead 26 made of nickel was drawn from the anode current collector 22A, and was welded to the battery can 11.

Next, succinic anhydride, ethylene carbonate, dimethyl carbonate and $LiPF_6$ were mixed to form an electrolyte solution. At that time, as the composition of the electrolyte solution, ethylene carbonate was fixed to 40 wt %, and $LiPF_6$ was fixed to 15 wt %, and the contents of succinic anhydride and dimethyl carbonate were changed in Examples 1-1 through 1-12. More specifically, as shown in Table 1, in Examples 1-1 through 1-12, the succinic anhydride content was changed within a range from 0.001 wt % to 10 wt %, and according to the succinic anhydride content, the dimethyl carbonate content was changed within a range from 44.999 wt % to 35 wt %.

Next, the electrolyte solution was injected into the battery can 11. After that, the battery can 11 was caulked by the gasket 17 of which the surface was coated with asphalt to fix the safety valve mechanism 15, the PTC device 16 and the battery cover 14, thereby hermeticity in the battery was maintained. Therefore, cylindrical secondary batteries with a diameter of 18 mm and a height of 65 mm were formed.

Moreover, as Comparative Example 1-1 relative to Examples 1-1 through 1-12, a secondary battery was formed as in the case of Examples 1-1 through 1-12, except that succinic anhydride was not mixed in the electrolyte solution, and the dimethyl carbonate content was 45 wt %. Further, as Comparative Examples 1-2 and 1-3, secondary batteries were formed as in the case of Examples 1-1 through 1-12, except that the copper-tin alloy was not used in the anode active material, and 90 parts by weight of graphite (KS-44 of Lonza), 2 parts by weight of acetylene black and 8 parts by weight of polyvinylidene fluoride were mixed to form an anode mixture, and further, in Comparative Example 1-2, succinic anhydride was not included in the electrolyte solution, and in Comparative Example 1-3, 5 wt % of succinic anhydride was mixed.

The cycle characteristics and the high temperature storage characteristics of the secondary batteries of Examples 1-1 through 1-12 and Comparative Examples 1-1 through 1-3 were evaluated through the following steps. The results are shown in Table 1.

<Cycle Characteristics>

As a charge-discharge cycle, in an environment of 25° C., the secondary batteries were charged at a constant current of 1000 mA until reaching an upper limit voltage of 4.2 V, and charge is continued at a constant voltage of 4.2 V, and then the secondary batteries were discharged at a constant current of 1000 mA until reaching an end voltage of 2.5 V. The charge-discharge cycle was repeated 100 times, and a capacity retention ratio (%) in the 100th cycle in the case where the discharge capacity in the first cycle was 100 was determined.

<High Temperature Storage Characteristics>

In an environment of 25° C., after the secondary batteries were charged at a constant current of 1000 mA and a constant voltage until reaching an upper limit voltage of 4.2 V, and charge is continued at a constant voltage of 4.2 V, the secondary batteries were discharged at a constant current of 1000 mA until reaching an end voltage of 2.5 V, and then the discharge capacities of the secondary batteries before storing were measured. Next, the secondary batteries were charged at a constant current of 1000 mA and a constant voltage up to an upper limit voltage of 4.2 V in an environment of 25° C., and then the secondary batteries were stored in a constant temperature bath at 60° C. for 30 days. After that, the secondary batteries were charged and discharged again under the same conditions as those before storing, and the discharge capacities of the secondary batteries after storing were determined, and the capacity retention ratio (%) after storing in the case where the discharge capacity before storing was 100 was determined.

As shown in Table 1, in Examples 1-1 through 1-12 in which succinic anhydride was mixed, the cycle characteristics and the high temperature storage characteristics could be improved, compared to Comparative Example 1-1 in which no succinic anhydride was mixed. On the other hand, in Comparative Examples 1-2 and 1-3, in which graphite was used as the anode active material, when succinic anhydride was mixed, the cycle characteristics and the high temperature storage characteristics declined. In other words, it was found out that in the case where an anode active material including tin as an element was used, when acid anhydride was mixed in the electrolyte solution, battery characteristics such as the cycle characteristics and the high temperature storage characteristics could be improved.

Moreover, there was a tendency that when the succinic anhydride content in the electrolyte solution increased, the cycle characteristics and the high temperature storage characteristics were improved to the maximum value, and then declined. In other words, it was found out that the acid anhydride content in the electrolyte solution was preferably within a range from 0.001 wt % to 10 wt % inclusive, more preferably within a range from 0.005 wt % to 4 wt % inclusive, and more preferably within a range from 0.01 wt % to 3 wt % inclusive.

Examples 2-1 Through 2-3

Secondary batteries were formed as in the case of Example 1-7, except that the kind of acid anhydride added to the electrolyte solution was changed. More specifically, maleic anhydride, phthalic anhydride and itaconic hydride were used in Example 2-1, Example 2-2 and Example 2-3, respectively, and the acid anhydride content in the electrolyte solution was 0.5 wt %.

The cycle characteristics and the high temperature storage characteristics of the secondary batteries of Examples 2-1 through 2-3 were evaluated as in the case of Example 1-7. The results are shown in Table 2 together with the results of Example 1-7 and Comparative Example 1-1.

TABLE 1

| | ANODE ACTIVE MATERIAL | ACID ANHYDRIDE KIND | ACID ANHYDRIDE CONTENT (WT %) | CYCLE CHARACTERISTICS (%) | HIGH TEMPERATURE CHARACTERISTICS (%) |
|---|---|---|---|---|---|
| EXAMPLE 1-1 | 10Cu—90Sn | SUCCINIC ANHYDRIDE | 0.001 | 4 | 85 |
| EXAMPLE 1-2 | | | 0.005 | 9 | 87 |
| EXAMPLE 1-3 | | | 0.01 | 15 | 88 |
| EXAMPLE 1-4 | | | 0.05 | 20 | 89 |
| EXAMPLE 1-5 | | | 0.1 | 23 | 90 |
| EXAMPLE 1-6 | | | 0.2 | 27 | 92 |
| EXAMPLE 1-7 | | | 0.5 | 27 | 95 |
| EXAMPLE 1-8 | | | 1 | 27 | 95 |
| EXAMPLE 1-9 | | | 1.5 | 23 | 94 |
| EXAMPLE 1-10 | | | 3 | 15 | 91 |
| EXAMPLE 1-11 | | | 4 | 9 | 88 |
| EXAMPLE 1-12 | | | 10 | 5 | 85 |
| COMPARATIVE EXAMPLE 1-1 | 10Cu—90Sn | — | — | 1 | 84 |
| COMPARATIVE EXAMPLE 1-2 | GRAPHITE | — | — | 60 | 85 |
| COMPARATIVE EXAMPLE 1-3 | GRAPHITE | SUCCINIC ANHYDRIDE | 0.5 | 55 | 81 |

TABLE 2

| | ANODE ACTIVE MATERIAL | ACID ANHYDRIDE KIND | CONTENT (WT %) | CYCLE CHARACTERISTICS (%) | HIGH TEMPERATURE CHARACTERISTICS (%) |
|---|---|---|---|---|---|
| EXAMPLE 1-7 | 10Cu—90Sn | SUCCINIC ANHYDRIDE | 0.5 | 27 | 95 |
| EXAMPLE 2-1 | | MALEIC ANHYDRIDE | | 28 | 95 |
| EXAMPLE 2-2 | | PHTALIC ANHYDRIDE | | 26 | 95 |
| EXAMPLE 2-3 | | ITACONIC ANHYDRIDE | | 22 | 93 |
| COMPARATIVE EXAMPLE 1-1 | 10Cu—90Sn | — | — | 1 | 84 |

As shown in Table 2, in Examples 2-1 through 2-3, as in the case of Example 1-7, the cycle characteristics and the high temperature storage characteristics could be improved, compared to Comparative Example 1-1 in which no acid anhydride was included. In other words, it was found out that even if another acid anhydride was used, the same effects could be obtained.

Examples 3-1, 3-2

Secondary batteries were formed as in the case of Example 1-7, except that the composition of the solvent was changed. More specifically, in Example 3-1, 40 wt % of 4-fluoro-1,3-dioxolane-2-one was mixed instead of ethylene carbonate, and in Example 3-2, a mixture including 20 wt % of ethylene carbonate and 20 wt % of 4-fluoro-1,3-dioxolane-2-one was used.

The cycle characteristics and the high temperature storage characteristics of the secondary batteries of Examples 3-1 and 3-2 were evaluated as in the case of Example 1-7. The results are shown in Table 3 together with the results of Example 1-7.

TABLE 3

| | ANODE ACTIVE MATERIAL | COMPOSITION OF ELECTROLYTE SOLUTION (WT %) | | | | CYCLE CHARACTERISTICS (%) | HIGH TEMPERATURE CHARACTERISTICS (%) |
|---|---|---|---|---|---|---|---|
| | | SUCCINIC ANHYDRIDE | FEC | EC | DMC | | |
| EXAMPLE 3-1 | 10Cu—90Sn | 0.5 | 40 | — | 44.5 | 50 | 96 |
| EXAMPLE 3-1 | | | 20 | 20 | 44.5 | 47 | 96 |
| EXAMPLE 1-7 | | | — | 40 | 44.5 | 27 | 95 |

FEC: 4-fluoro-1,3-dioxolane-2-one
EC: ethylene carbonate
DMC: dimethyl carbonate As shown in Table 3, in Examples 3-1 through 3-2 in which 4-fluoro-1,3-dioxolane-2-one was mixed in the electrolyte solution, the cycle characteristics and the high temperature storage characteristics could be further improved, compared to Example 1-7 in which 4-fluoro-1,3-dioxolane-2-one was not mixed. In other words, it was found out that when an acid anhydride and 4-fluoro-1,3-dioxolane-2-one were included in the electrolyte solution, the battery characteristics such as the cycle characteristics and the high temperature storage characteristics could be further improved.

Examples 4-1 Through 4-12

Secondary batteries were formed as in the case of Example 1-7, except that as the anode active material, instead of the copper-tin alloy powder, another tin-containing alloy powder was used. More specifically, cobalt-tin (10Co-90Sn) alloy powder, cobalt-titanium-tin (9Co-1Ti-90Sn) alloy powder, cobalt-germanium-tin (9Co-1Ge-90Sn) alloy powder, cobalt-bismuth-tin (9Co-1Bi-90Sn) alloy powder, cobalt-antimony-tin (9Co-1Sb-90Sn) alloy powder, cobalt-zinc-tin (9Co-1Zn-90Sn) alloy powder, cobalt-iron-tin (9Co-1Fe-90Sn) alloy powder, cobalt-copper-tin (9Co-1Cu-90Sn) alloy powder, cobalt-nickel-tin (9Co-1Ni-90Sn) alloy powder, cobalt-chromium-tin (9Co-1Cr-90Sn) alloy powder, cobalt-silver-tin (9Co-1Ag-90Sn) alloy powder, and cobalt-manganese-tin (9Co-1Mn-90Sn) alloy powder were used in Examples 4-1 through 4-12, respectively. The number before a chemical symbol indicates a weight ratio. These tin-containing alloy powders were formed by a melting method as in the case of Example 1-7.

The cycle characteristics and the high temperature storage characteristics of the secondary batteries of Examples 4-1 through 4-12 were evaluated as in the case of Example 1-7. The results are shown in Table 4.

TABLE 4

| | ANODE ACTIVE MATERIAL | ACID ANHYDRIDE KIND | ACID ANHYDRIDE CONTENT (WT %) | CYCLE CHARACTERISTICS (%) | HIGH TEMPERATURE CHARACTERISTICS (%) |
|---|---|---|---|---|---|
| EXAMPLE 1-7 | 10Cu—90Sn | SUCCINIC ANHYDRIDE | 0.5 | 27 | 95 |
| EXAMPLE 4-1 | 10Co—90Sn | | | 32 | 95 |
| EXAMPLE 4-2 | 9Co—1Ti—90Sn | | | 36 | 94 |
| EXAMPLE 4-3 | 9Co—1Ge—90Sn | | | 36 | 93 |
| EXAMPLE 4-4 | 9Co—1Bi—90Sn | | | 36 | 95 |
| EXAMPLE 4-5 | 9Co—1Sb—90Sn | | | 28 | 92 |
| EXAMPLE 4-6 | 9Co—1Zn—90Sn | | | 32 | 95 |
| EXAMPLE 4-7 | 9Co—1Fe—90Sn | | | 35 | 96 |
| EXAMPLE 4-8 | 9Co—1Cu—90Sn | | | 30 | 94 |
| EXAMPLE 4-9 | 9Co—1Ni—90Sn | | | 33 | 94 |
| EXAMPLE 4-10 | 9Co—1Cr—90Sn | | | 30 | 95 |
| EXAMPLE 4-11 | 9Co—1Ag—90Sn | | | 38 | 96 |
| EXAMPLE 4-12 | 9Co—1Mn—90Sn | | | 33 | 95 |

As shown in Table 4, in Examples 4-1 through 4-12, the cycle characteristics could be further improved than those in Example 1-7. In other words, it was found out that an anode active material including tin and at least one kind selected from the group consisting of nickel, copper, iron, cobalt, manganese, zinc, indium, silver, titanium, germanium, bismuth, antimony and chromium as elements was preferably used.

Examples 5-1 Through 5-11

Secondary batteries were formed as in the case of Examples 1-1 through 1-12, except that as the anode active material, instead of the copper-tin alloy powder, in Examples 5-1 through 5-6 and 5-8 through 5-11, CoSnC-containing material powder was used, and in Example 5-7, CoSn alloy powder was used. Moreover, as the electrolyte solution, a mixture including 0.5 wt % of succinic anhydride, 10 wt % of 4-fluoro-1,3-dioxolane-2-one, 30 wt % of ethylene carbonate, 44.5 wt % of dimethyl carbonate and 15 wt % of $LiPF_6$ was used.

The CoSnC-containing material powder was formed as below. At first, as materials, cobalt powder, tin powder and carbon powder were prepared, and the cobalt powder and the tin powder were alloyed to form cobalt.tin alloy powder, and then the carbon powder was added to the alloy powder, and dry mixed. Next, the mixture was put into a reaction vessel of a planetary ball mill of Ito Seisakusho together with approximately 400 g of steel balls with a diameter of 9 mm. Next, an argon atmosphere is introduced into the reaction vessel, and the cycle of 10-minute operation at 250 rpm and a 10-minute interval was repeated until the total operation time reached 30 hours. Thereby, the CoSnC-containing material was synthesized through the use of a mechanohemical reaction. After that, the reaction vessel was cooled down to a room temperature, and synthesized CoSnC-containing material powder was taken out from the reaction vessel, and the CoSnC-containing material powder was shifted through a sieve having 280 meshes to remove coarse grains of the CoSnC-containing material powder. At that time, in Examples 5-1 through 5-6, the carbon content was fixed, and the ratio of cobalt to the total of tin and cobalt (hereinafter referred to as Co/(Sn+Co) ratio) was changed, and in Examples 5-8 through 5-11, the Co/(Sn+Co) ratio was fixed, and the carbon content was changed.

The CoSn alloy powder was formed as in the case of CoSnC-containing material powder, except that the Co/(Sn+Co) ratio was 37 wt %, and carbon was not included.

Figure 5:
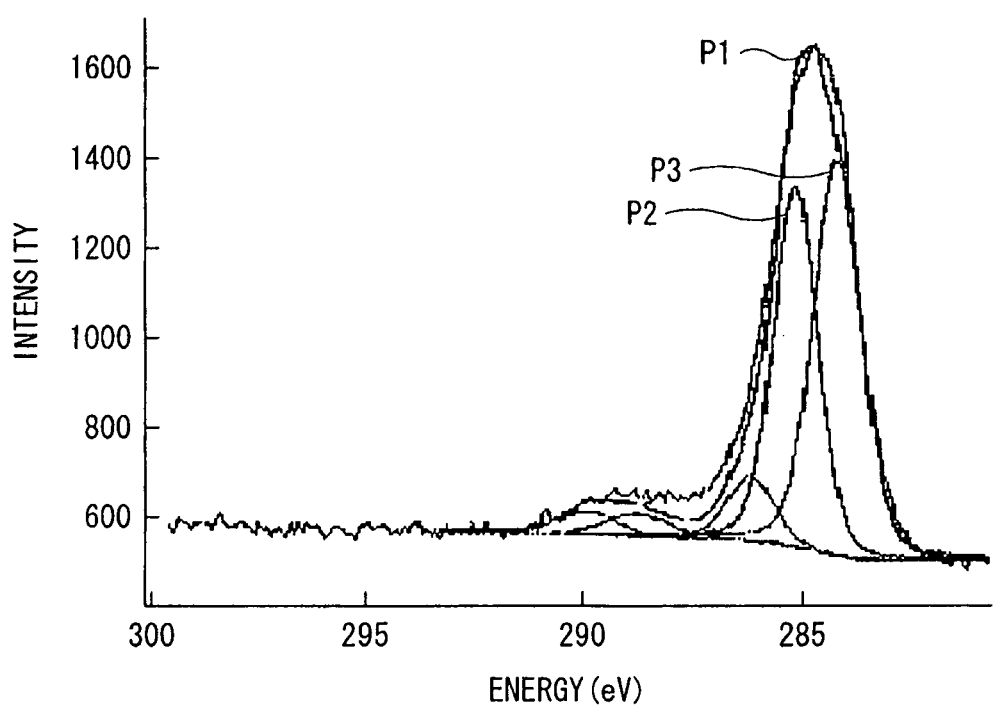
FIG. 5 is an illustration showing an example of a peak of a CoSnC-containing material formed in an example which is obtained by X-ray photoelectron spectroscopy.

The compositions of the obtained CoSnC-containing materials and the obtained CoSn alloy were analyzed. The carbon content was measured by a carbon/sulfur analyzer, and the contents of cobalt and tin were measured by ICP (Inductively Coupled Plasma) emission spectrometry. The results are shown in Tables 5 and 6. Moreover, when X-ray diffraction on the obtained CoSnC-containing materials was performed, a diffraction peak having a broad half-width with a diffraction angle $2\theta$ of $1.0°$ or more within a diffraction angle $2\theta=20°$ to $50°$ was observed. Further, when XPS measurement was performed on the CoSnC-containing materials, a peak P1 shown in FIG. 5 was obtained. When the peak P1 was analyzed, the peak P2 of surface contamination carbon and the peak P3 of C1s in the CoSnC-containing material on a lower energy side than the peak P2 were obtained. The peak P3 was obtained in a region lower than 284.5 eV. In other words, it was confirmed that carbon in the CoSnC-containing material was bonded to another element.

As Comparative Examples 5-1 through 5-11 relative to Examples 5-1 through 5-11, secondary batteries were formed as in the case of Examples 5-1 through 5-11, except that succinic anhydride was not included in the electrolyte solution, and the dimethyl carbonate content was 45 wt %. The composition of the anode active material was changed as in the case of Examples 5-1 through 5-11.

The cycle characteristics and the high temperature storage characteristics of the secondary batteries of Examples 5-1 through 5-11 and Comparative Examples 5-1 through 5-11 were evaluated as in the case of Examples 1-1 through 1-12. The results are shown in Tables 5 and 6. In Tables 5 and 6, the discharge capacity in the first cycle is also shown as an initial discharge capacity.

TABLE 5

| | COMPOSITION OF ANODE ACTIVE MATERIAL (WT %) | | | | SUCCINIC ANHYDRIDE CONTENT (WT %) | CYCLE CHARACTERISTICS (%) | HIGH TEMPERATURE CHARACTERISTICS (%) | INITIAL DISCHARGE CAPACITY (mAh) |
|---|---|---|---|---|---|---|---|---|
| | Co | Sn | C | Co/(Sn + Co) | | | | |
| EXAMPLE 5-1 | 66.8 | 22.3 | 9.9 | 75 | 0.5 | 91 | 95 | 1600 |
| EXAMPLE 5-2 | 62.4 | 26.7 | | 70 | | 90 | 96 | 2260 |
| EXAMPLE 5-3 | 53.5 | 35.6 | | 60 | | 89 | 96 | 2355 |
| EXAMPLE 5-4 | 33 | 56.1 | | 37 | | 87 | 97 | 2855 |
| EXAMPLE 5-5 | 26.7 | 63 | | 30 | | 85 | 97 | 2945 |
| EXAMPLE 5-6 | 17.8 | 71.3 | | 20 | | 35 | 95 | 3150 |
| COMPARATIVE EXAMPLE 5-1 | 66.8 | 22.3 | 9.9 | 75 | — | 89 | 86 | 1660 |
| COMPARATIVE EXAMPLE 5-2 | 62.4 | 26.7 | | 70 | | 88 | 86 | 2250 |
| COMPARATIVE EXAMPLE 5-3 | 53.5 | 35.6 | | 60 | | 86 | 85 | 2350 |
| COMPARATIVE EXAMPLE 5-4 | 33 | 56.1 | | 37 | | 84 | 86 | 2850 |
| COMPARATIVE EXAMPLE 5-5 | 26.7 | 63 | | 30 | | 83 | 86 | 2940 |
| COMPARATIVE EXAMPLE 5-6 | 17.8 | 71.3 | | 20 | | 33 | 85 | 3100 |

TABLE 6

| | COMPOSITION OF ANODE ACTIVE MATERIAL (WT %) | | | | SUCCINIC ANHYDRIDE CONTENT (WT %) | CYCLE CHARACTERISTICS (%) | HIGH TEMPERATURE CHARACTERISTICS (%) | INITIAL DISCHARGE CAPACITY (mAh) |
|---|---|---|---|---|---|---|---|---|
| | Co | Sn | C | Co/(Sn + Co) | | | | |
| EXAMPLE 5-7 | 36.6 | 62.4 | 0 | 37 | 0.5 | 32 | 93 | 2035 |
| EXAMPLE 5-4 | 33 | 56.1 | 9.9 | | | 87 | 97 | 2855 |
| EXAMPLE 5-8 | 31.1 | 53 | 14.9 | | | 91 | 96 | 3065 |
| EXAMPLE 5-9 | 29.3 | 49.9 | 19.8 | | | 84 | 95 | 3280 |
| EXAMPLE 5-10 | 25.6 | 43.7 | 29.7 | | | 80 | 95 | 2995 |
| EXAMPLE 5-11 | 22 | 37.4 | 39.6 | | | 36 | 93 | 2175 |
| COMPARATIVE EXAMPLE 5-7 | 36.6 | 62.4 | 0 | 37 | — | 28 | 83 | 2030 |
| COMPARATIVE EXAMPLE 5-4 | 33 | 56.1 | 9.9 | | | 84 | 86 | 2850 |
| COMPARATIVE EXAMPLE 5-8 | 31.1 | 53 | 14.9 | | | 88 | 85 | 3060 |
| COMPARATIVE EXAMPLE 5-9 | 29.3 | 49.9 | 19.8 | | | 82 | 84 | 3270 |
| COMPARATIVE EXAMPLE 5-10 | 25.6 | 43.7 | 29.7 | | | 78 | 85 | 2990 |
| COMPARATIVE EXAMPLE 5-11 | 22 | 37.4 | 39.6 | | | 33 | 82 | 2170 |

As shown in Tables 5 and 6, in Examples 5-1 through 5-11, as in the case of Examples 1-1 through 1-12, the cycle characteristics and the high temperature storage characteristics could be improved, compared to Comparative Examples 5-1 through 5-11 in which no acid anhydride was included. In other words, it was found out that even if another anode active material including tin as an element was used, the same effects could be obtained.

Moreover, as shown in Table 5, there was a tendency that as the Co/(Sn+Co) ratio increased, the cycle characteristics was improved, and the initial discharge capacity declined. Further, as shown in Table 6, there was tendency that as the carbon content increased, the capacity retention ratio and the initial discharge capacity were improved to the maximum value, then declined. In other words, it was found out that when a CoSnC-containing material in which the carbon content was within a range from 9.9 wt % to 29.7 wt % inclusive, and the Co/(Sn+Co) ratio was within a range from 30 wt % to 70 wt % inclusive was preferably used, because a high energy density and superior cycle characteristics could be obtained.

Examples 6-1, 6-2

Secondary batteries were formed as in the case of Examples 5-1 through 5-11, except that the composition of the CoSnC-containing material was changed. At that time, in Example 6-1, the CoSnC-containing material was formed as in the case of Examples 5-1 through 5-11, except that as materials, cobalt powder, tin powder, carbon powder and silicon powder were prepared, and the cobalt powder and the tin powder were alloyed to form cobalt-tin alloy powder, and then the carbon powder and the silicon powder were added to and mixed with the alloy powder. In Example 6-2, the CoSnC-containing material was formed as in the case of Examples 5-1 through 5-11, except that as materials, cobalt powder, tin powder, carbon powder and titanium powder were prepared, and the cobalt powder, the tin powder and the titanium powder were alloyed to form cobalt-tin-titanium alloy powder, and then the carbon powder was added to and mixed with the alloy powder.

The compositions of the obtained CoSnC-containing materials were analyzed as in the case of Examples 5-1 through 5-11. The results are shown in Tables 7 and 8. Moreover, when X-ray diffraction was performed on the obtained CoSnC-containing materials, a diffraction peak having a broad half-width with a diffraction angle 2θ of 1.0° or more within a diffraction angle 2θ=20° to 50° was observed. Further, when XPS measurement was performed on the CoSnC-containing materials, as in the case of Examples 5-1 through 5-6 and 5-8 through 5-11, the peak P3 of C1s in the CoSnC-containing materials was obtained in a region lower than 284.5 eV. In other words, it was confirmed that carbon in the CoSnC-containing materials was bonded to another element.

As the composition of the electrolyte solution, as in the case of Examples 5-1 through 5-11, succinic anhydride was 0.5 wt %, 4-fluoro-1,3-dioxolane-2-one was 10 wt %, ethylene carbonate was 30 wt %, dimethyl carbonate was 44.5 wt %, and $LiPF_6$ was 15 wt %.

As Comparative Examples 6-1 and 6-2 relative to Examples 6-1 and 6-2, secondary batteries were formed as in the case of Examples 6-1 and 6-2, except that succinic anhydride was not included in the electrolyte solution, and the dimethyl carbonate content was 45 wt %.

The cycle characteristics and the high temperature storage characteristics of the secondary batteries of Examples 6-1 and 6-2 and Comparative Examples 6-1 and 6-2 were evaluated as in the case of Examples 5-1 through 5-11. The results are shown in Tables 7 and 8 together with the initial discharge capacity.

included in the CoSnC-containing material, because the characteristics could be further improved.

Examples 7-1 Through 7-17

Figure 6:
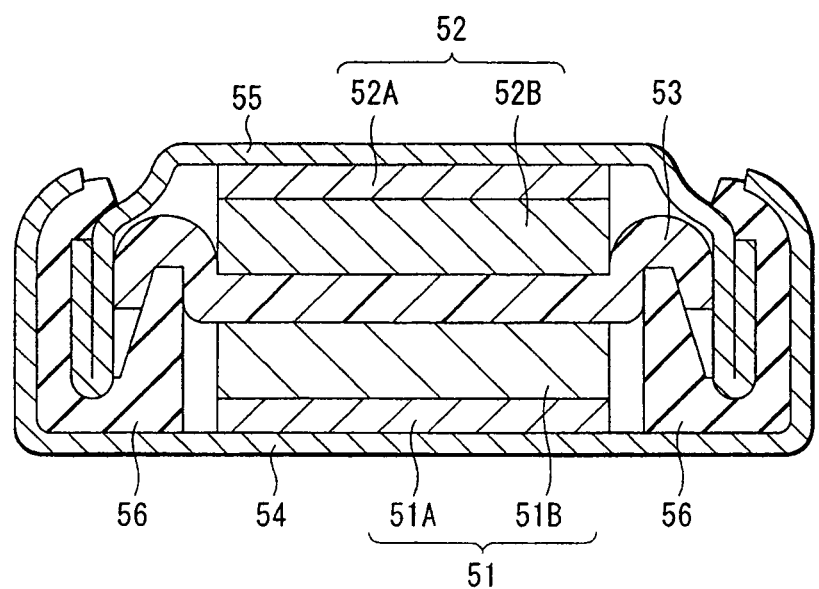
FIG. 6 is a sectional view of a secondary battery formed in an example.

Coin-type secondary batteries shown in FIG. 6 were formed. The secondary batteries were formed through laminating a cathode 51 and an anode 52 with a separator 53 impregnated with an electrolyte solution in between to form a laminate, sandwiching the laminate between a package can 54 and a package cup 55, and caulking the package can 54 and the package cup 55 with a gasket 56. At first, as a cathode active material, 94 parts by weight of lithium-cobalt complex oxide ($LiCoO_2$), 3 parts by weight of graphite as an electrical conductor and 3 parts by weight of polyvinylidene fluoride as a binder were mixed to form a mixture, and then N-methyl-2-pyrrolidone as a solvent was added to the mixture to obtain cathode mixture slurry. Next, the obtained cathode mixture slurry was uniformly applied to a cathode current collector 51A made of aluminum foil with a thickness of 20 μm, and was dried, thereby a cathode active material layer 51B with a thickness of 70 μm was formed. After that, the cathode current collector 51A on which the cathode active material layer 51B was formed was stamped into a circular shape with a diameter of 15 mm to form the cathode 51.

Moreover, as an anode active material, a CoSnC-containing material was used, and 94 parts by weight of the CoSnC-containing material, 3 parts by weight of graphite as an electrical conductor and 3 parts by weight of polyvinylidene fluoride as a binder were dispersed in N-methyl-2-pyrrolidone as a solvent, and then the solvent was uniformly applied to an anode current collector 52A made of copper foil with a thickness of 15 μm, and was dried, thereby an anode active

TABLE 7

| | COMPOSITION OF ANODE ACTIVE MATERIAL (WT %) | | | | | SUCCINIC ANHYDRIDE CONTENT (WT %) | CYCLE CHARAC-TERISTICS (%) | HIGH TEMPERATURE CHARAC-TERISTICS (%) | INITIAL DISCHARGE CAPACITY (mAh) |
|---|---|---|---|---|---|---|---|---|---|
| | Co | Sn | C | Si | $\frac{Co}{Sn + Co}$ | | | | |
| EXAMPLE 6-1 | 27.8 | 47.4 | 19.8 | 4 | 37 | 0.5 | 85 | 96 | 3420 |
| COMPARATIVE EXAMPLE 6-1 | 27.8 | 47.4 | 19.8 | 4 | 37 | — | 84 | 84 | 3400 |

TABLE 8

| | COMPOSITION OF ANODE ACTIVE MATERIAL (WT %) | | | | | SUCCINIC ANHYDRIDE CONTENT (WT %) | CYCLE CHARAC-TERISTICS (%) | HIGH TEMPERATURE CHARAC-TERISTICS (%) | INITIAL DISCHARGE CAPACITY (mAh) |
|---|---|---|---|---|---|---|---|---|---|
| | Co | Sn | C | Si | $\frac{Co}{Sn + Co}$ | | | | |
| EXAMPLE 6-2 | 26.3 | 48.9 | 19.8 | 4 | 35 | 0.5 | 89 | 96 | 3390 |
| COMPARATIVE EXAMPLE 6-2 | 26.3 | 48.9 | 19.8 | 4 | 35 | — | 88 | 85 | 3350 |

As shown in Tables 7 and 8, in Examples 6-1 and 6-2, as in the case of Examples 5-1 through 5-11, the cycle characteristics and the high temperature storage characteristics could be improved, compared to Comparative Examples 6-1 and 6-2 in which no acid anhydride was included. Moreover, it was obvious from a comparison between Examples 6-1 and 6-2 and Example 5-9 shown in Table 6 that when silicon or titanium was included, characteristics could be further improved. In other words, it was found out that if necessary, another element such as silicon or titanium was preferably material layer 52B with a thickness of 70 μm was formed. After that, the anode current collector 52A on which the anode active material layer 52B was formed was stamped into a circular shape with a diameter of 16 mm to form the anode 52.

At that time, a CoSnC-containing material was formed as in the case of Examples 5-1 through 5-11, except that as materials, cobalt-tin-indium-titanium alloy powder and carbon powder were prepared, and the carbon powder was added to and mixed with the alloy powder. When the composition of the obtained CoSnC-containing material was analyzed as in the case of Examples 5-1 through 5-11, the tin content was 48.0 wt %, the cobalt content was 23.0 wt %, the indium content was 5.0 wt %, the titanium content was 2.0 wt %, the carbon content was 20.0 wt %, and Co/(Sn+Co) was 32 wt %. Moreover, when X-ray diffraction was performed on the obtained CoSnC-containing material, a diffraction peak having a broad half-width with a diffraction angle 2θ of 1.0° or more within a diffraction angle 2θ=20° to 50° was observed. Further, when XPS measurement was performed on the CoSnC-containing material, as in the case of Example 5-1 through 5-6 and 5-8 through 5-11, the peak P3 of C1s in the CoSnC-containing material was obtained in a region lower than 284.5 eV. In other words, it was confirmed that carbon in the CoSnC-containing material was bonded to another element.

Next, after the cathode 51 and the anode 52 were laminated with the separator 53 made of a microporous polypropylene film with a thickness of 25 g m, 0.1 g of the electrolyte solution was injected into the separator 52, and they were put into the package cup 55 made of stainless and the package can 54 made of stainless, and the package cup 55 and the package can 54 were caulked, thereby the secondary battery shown in FIG. 6 was obtained.

The electrolyte solution was formed through mixing a high-permittivity solvent, dimethyl carbonate as a low-viscosity solvent and $LiPF_6$ as an electrolyte salt at a weight ratio of the high-permittivity solvent:dimethyl carbonate:$LiPF_6$=42:42:16, and then adding an acid anhydride as an additive. At that time, as the high-permittivity solvent, in Example 7-1,4-chloro-1,3-dioxolane-2-one was used, and in Examples 7-2 through 7-17, 4-fluoro-1,3-dioxolane-2-one was used. Moreover, as the acid anhydride, glutaric anhydride, maleic anhydride, phthalic anhydride, 2-sulfobenzoic anhydride, citraconic anhydride, itaconic anhydride, diglycolic anhydride, hexafluoroglutaric anhydride, 3-fluorophthalic anhydride, 4-fluorophthalic anhydride, 3,6-epoxy-1,2,3,6-tetrahydrophthalic anhydride, 1,8-naphthalic anhydride, and 2,3-naphthalenecarboxylic anhydride were used in Examples 7-1 through 7-5, Example 7-6, Example 7-7, Example 7-8, Example 7-9, Example 7-10, Example 7-11, Example 7-12, Example 7-13, Example 7-14, Example 7-15, Example 7-16 and Example 7-17, respectively. Further, the acid anhydride content in the electrolyte solution was 0.1 wt %, 1 wt %, 2 wt % or 2.5 wt % as shown in Table 9.

As Comparative Examples 7-1 and 7-2 relative to Examples 7-1 through 7-17, secondary batteries were formed as in the case of Examples 7-1 through 7-17, except that no acid anhydride was added. At that time, as the high-permittivity solvent, in Comparative Example 7-1,4-chloro-1,3-dioxolane-2-one was used, and in Comparative Example 7-2, 4-fluoro-1,3-1,3-dioxolane-2-one was used.

The cycle characteristics of the secondary batteries of Examples 7-1 through 7-17 and Comparative Examples 7-1 and 7-2 were evaluated as below. At first, 100 charge-discharge cycles in which the batteries were charged at 1.77 mA up to an upper limit of 4.2 V for 12 hours, and then after a 10-minute interval, the batteries were discharged at 1.77 mA until reaching 2.5 V were performed, and the discharge capacity retention ratio of each battery in the 100th cycle in the case where the discharge capacity in the first cycle was 100 was determined. The results are shown in Table 9.

TABLE 9

| | HIGH-PERMITTIVITY SOLVENT | ACID ANHYDRIDE KIND | CONTENT (WT %) | CYCLE CHARACTERISTICS (%) |
|---|---|---|---|---|
| EXAMPLE 7-1 | CIEC | GLUTARIC ANHYDRIDE | 1 | 76.2 |
| EXAMPLE 7-2 | FEC | GLUTARIC ANHYDRIDE | 0.1 | 70.4 |
| EXAMPLE 7-3 | | | 1 | 88.9 |
| EXAMPLE 7-4 | | | 2 | 66.9 |
| EXAMPLE 7-5 | | | 2.5 | 64.0 |
| EXAMPLE 7-6 | | MALEIC ANHYDRIDE | 1 | 88.4 |
| EXAMPLE 7-7 | | PHTHALIC ANHYDRIDE | 1 | 92.9 |
| EXAMPLE 7-8 | | 2-SULFOBENZOIC ANHYDRIDE | 1 | 88.7 |
| EXAMPLE 7-9 | | CITRACONIC ANHYDRIDE | 1 | 85.6 |
| EXAMPLE 7-10 | | ITACONIC ANHYDRIDE | 1 | 95.8 |
| EXAMPLE 7-11 | | DIGLYCOLIC ANHYDRIDE | 1 | 92.5 |
| EXAMPLE 7-12 | | HEXAFLUOROGLUTARIC ANHYDRIDE | 1 | 92.9 |
| EXAMPLE 7-13 | | 3-FLUOROPHTHALIC ANHYDRIDE | 1 | 89.5 |
| EXAMPLE 7-14 | | 4-FLUOROPHTHALIC ANHYDRIDE | 1 | 89.7 |
| EXAMPLE 7-15 | | 3,6-EPOXY-1,2,3,6-TETRAHYDROPHTHALIC ANHYDRIDE | 1 | 87.0 |
| EXAMPLE 7-16 | | 1,8-NAPHTHALIC ANHYDRIDE | 1 | 85.6 |
| EXAMPLE 7-17 | | 2,3-NAPHTHALENECARBOXYLIC ANHYDRIDE | 1 | 89.1 |
| COMPARATIVE EXAMPLE 7-1 | CIEC | NOT INCLUDED | 0 | 51.8 |
| COMPARATIVE EXAMPLE 7-2 | FEC | NOT INCLUDED | 0 | 63.4 |

ANODE ACTIVE MATERIAL: 23Co—5In—2Ti—20C—48Sn
CIEC: 4-chloro-1,3-dioxolane-2-one
FEC: 4-fluoro-1,3-dioxolane-2-one It was obvious from Table 9 that in Examples 7-1 through 7-17, as in the case of Examples 5-1 through 5-11, the cycle characteristics could be improved, compared to Examples 7-1 and 7-2 in which no acid anhydride was included. In particular, superior cycle characteristics could be obtained in Examples 7-2 through 7-17 in which 4-fluoro-1,3-dioxolane-2-one was used.

In other words, it was found out that when the CoSnC-containing material including another element such as indium or titanium was used, and an acid anhydride was used, battery characteristics such as the cycle characteristics could be improved. Moreover, it was found out that in the case where another derivative of a cyclic carbonate having a halogen atom was used, the battery characteristics such as the cycle characteristics could be further improved. Further, it was found out that 4-fluoro-1,3-dioxolane-2-one was preferably included.

Examples 8-1 Through 8-4

Secondary batteries were formed as in the case of Example 1-7, except that as the anode active material, instead of copper-tin alloy powder, silicon-containing alloy powder was used. More specifically, in Example 8-1, copper-silicon (20Co-80Si) alloy powder was used, in Example 8-2, cobalt-silicon (20Co-80Si) alloy powder was used, in Example 8-3, cobalt-indium-silicon (18Co-2In-80Si) alloy powder was used, in Example 8-4, cobalt-indium-titanium-silicon (16Co-2In-2Ti-80Si) alloy powder was used. The number before a chemical symbol indicates a weight ratio. These silicon-containing alloy powders were formed by a melting method as in the case of Example 1-7.

As the composition of the electrolyte solution, as in the case of Example 1-7, succinic anhydride was 0.5 wt %, ethylene carbonate was 40 wt %, dimethyl carbonate was 44.5 wt % and LiPF$_6$ was 15 wt %.

Moreover, as Comparative Example 8-1 relative to Example 8-1, a secondary battery was formed as in the case of Example 8-1, except that succinic anhydride was not mixed in the electrolyte solution, and the dimethyl carbonate content was 45 wt %.

The cycle characteristics and the high temperature storage characteristics of the secondary batteries of Examples 8-1 through 8-4 and Comparative Example 8-1 were evaluated. The results are shown in Table 10.

modified. For example, in the above-described embodiments and the above-described examples, the case where the electrolyte solution is used as an electrolyte is described, and in the above-described embodiments, the case where a gel electrolyte in which a high molecular weight compound holds an electrolyte solution is used is described. However, any other electrolyte may be used. Examples of the other electrolyte include a mixture of an inorganic ion conductive compound such as ion conductive ceramic, ion conductive glass or ionic crystal and an electrolyte solution, a mixture of any other organic compound and an electrolyte solution and a mixture of these organic compounds and a gel electrolyte.

Moreover, in the embodiments and the examples, a battery using lithium as an electrode reactant is described; however, the invention can be applied to the case where any other alkali metal such as sodium (Na) or potassium (K), an alkaline-earth metal such as magnesium or calcium (Ca) or other light metal such as aluminum is used. At this time, as the anode, an anode active material including tin or silicon as an element described in the above embodiments can be used in a like manner.

Further, in the embodiments and the examples, the cylindrical secondary battery, the laminate film type secondary battery or the coin type secondary battery are described; however, the invention can be applied to a battery with any other shape such as a button shape, a prismatic shape or a secondary battery with any other structure such as a laminate structure in a like manner. Further, the invention is applicable to not only the secondary batteries but also any other battery such as primary batteries.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described

TABLE 10

| | ANODE ACTIVE MATERIAL | ACID ANHYDRIDE CONTENT (WT %) | CYCLE CHARACTERISTICS (%) | HIGH TEMPERATURE CHARACTERISTICS (%) |
|---|---|---|---|---|
| EXAMPLE 8-1 | 20Cu—80Si | 0.5 | 28 | 95 |
| EXAMPLE 8-2 | 20Co—80Sn | | 30 | 94 |
| EXAMPLE 8-3 | 18Co—2In—80Si | | 37 | 95 |
| EXAMPLE 8-4 | 16Co—2In—2Ti—80Si | | 40 | 95 |
| COMPARATIVE EXAMPLE 8-1 | 20Cu—80Si | — | 25 | 85 |

As shown in Table 10, in Example 8-1, as in the case of Example 1-7, the cycle characteristics and the high temperature storage characteristics could be improved, compared to Comparative Example 8-1 in which no acid anhydride was included. In other words, it was found out that even if another anode active material including silicon as an element was used, the same effects could be obtained.

Moreover, in Examples 8-2 through 8-4, the cycle characteristics could be further improved than those in Example 8-1. In other words, it was found out that if necessary, another element was preferably included, because the cycle characteristics could be further improved.

Although the invention is described referring to the embodiments and the examples, the invention is not limited to the embodiments and the examples, and can be variously herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery, comprising:
a cathode;
an anode; and
an electrolyte solution,
wherein the anode includes an anode active material that includes a CoSnC-containing compound including carbon ranging from about 9.9 wt % to about 29.7 wt %, and a ratio of cobalt to a total amount of tin and cobalt ranging from about 30 wt % to about 70 wt % inclusive, wherein the electrolyte solution includes 4-fluoro-1,3-dioxolane-2-one and at least one anhydride selected from the group consisting of: succinic anhydride, maleic anhydride, phthalic anhydride, itaconic anhydride, glutaric anhydride, 2-sulfobenzoic anhydride, citraconic anhydride, diglycolic anhydride, hexafluoroglutaric anhydride, 3-fluorophthalic anhydride, 4-fluorophthalic anhydride, 3,6-epoxy-1,2,3,6-tetrahydrophthalic anhydride, 1,8-naphthalic anhydride and 2,3-naphthalenecarboxylic anhydride.

2. A battery according to claim 1, wherein a content of the at least one anhydride in the electrolyte solution ranges from about 0.001 wt % to about 10 wt %.

3. A battery according to claim 1, wherein a content of the at least one anhydride in the electrolyte solution ranges from about 0.005 wt % to about 4 wt %.

4. A battery according to claim 1, wherein a content of the at least one anhydride in the electrolyte solution ranges from about 0.01 wt % to about 3 wt %.

5. A battery according to claim 1, wherein in the CoSnC-containing compound, a 1s peak of the carbon is obtained in a region lower than 284.5 eV by X-ray photoelectron spectroscopy.

6. A battery according to claim 1, wherein the CoSnC-containing compound includes a reactive phase which can react with lithium and of which a half-width of a diffraction peak obtained by X-ray diffraction is 1.0° or more.

7. A battery according to claim 1, wherein the CoSnC-containing compound further includes one or more elements selected from the group consisting of silicon, iron, nickel, chromium, indium, niobium, germanium, titanium, molybdenum, aluminum, phosphorus, gallium or bismuth.

8. A battery according to claim 1, wherein the CoSnC-containing compound further includes one or more elements selected from the group consisting of silicon and titanium.

9. A battery according to claim 1, wherein the battery is rechargeable.

10. A battery according to claim 1, wherein in the CoSnC-containing material, at least a part of carbon is bonded to a second element, wherein the second element is a metal element or a metalloid element.

11. A battery according to claim 1, wherein the at least one anhydride is selected from the group consisting of: succinic anhydride, maleic anhydride, phthalic anhydride, itaconic anhydride, glutaric anhydride, 2-sulfobenzoic anhydride, citraconic anhydride, diglycolic anhydride, 3,6-epoxy-1,2,3,6-tetrahydrophthalic anhydride, 1,8-naphthalic anhydride and 2,3-naphthalenecarboxylic anhydride.

12. A battery, comprising:
a cathode;
an anode; and
an electrolyte solution,
wherein the anode includes an anode active material that includes a CoSnC-containing compound including carbon ranging from about 9.9 wt % to about 29.7 wt %, and a ratio of cobalt to a total amount of tin and cobalt ranging from about 30 wt % to about 70 wt % inclusive,
wherein the electrolyte solution includes succinic anhydride, 4-fluoro-1,3-dioxolane-2-one, ethylene carbonate, dimethyl carbonate and $LiPF_6$.

13. A battery according to claim 12, wherein the electrolyte solution includes 0.5 wt % of succinic anhydride, 10 wt % of 4-fluoro-1,3-dioxolane-2-one, 30 wt % of ethylene carbonate, 44.5 wt % of dimethyl carbonate and 15 wt % of $LiPF_6$.

14. A battery, comprising:
a cathode;
an anode; and
an electrolyte solution,
wherein the anode includes an anode active material that includes a CoSnC-containing compound including carbon ranging from about 9.9 wt % to about 29.7 wt %, and a ratio of cobalt to a total amount of tin and cobalt ranging from about 30 wt % to about 70 wt % inclusive,
wherein the electrolyte solution includes 0.5 wt % of succinic anhydride, 10 wt % of 4-fluoro-1,3-dioxolane-2-one, 30 wt % of ethylene carbonate, 44.5 wt % of dimethyl carbonate and 15 wt % of $LiPF_6$.

* * * * *